(12) United States Patent
Ahmad et al.

(10) Patent No.: US 8,767,326 B2
(45) Date of Patent: Jul. 1, 2014

(54) DYNAMICALLY CONTROLLING MAGNETORESISTIVE BIAS

(75) Inventors: Said Abdullah Ahmad, Tucson, AZ (US); Josephine Faith Bayang, Tucson, AZ (US); Eric Rolf Christensen, Tucson, AZ (US); Ernest Stewart Gale, Tucson, AZ (US)

(73) Assignee: Industrial Business Machines Corporation, Armonk, NY (US)

( * ) Notice: Subject to any disclaimer, the term of this patent is extended or adjusted under 35 U.S.C. 154(b) by 0 days.

(21) Appl. No.: 13/597,106

(22) Filed: Aug. 28, 2012

(65) Prior Publication Data

US 2014/0063638 A1 Mar. 6, 2014

(51) Int. Cl.
*G11B 27/36* (2006.01)
*G11B 5/03* (2006.01)

(52) U.S. Cl.
USPC ............................................. 360/31; 360/66

(58) Field of Classification Search
None
See application file for complete search history.

(56) References Cited

U.S. PATENT DOCUMENTS

| | | | |
|---|---|---|---|
| 4,635,142 A | 1/1987 | Haugland | |
| 5,467,231 A | 11/1995 | Nash et al. | |
| 6,067,200 A | 5/2000 | Ohba et al. | |
| 6,764,006 B1 * | 7/2004 | Brocko et al. | 235/449 |
| 7,027,243 B2 | 4/2006 | Mitchell et al. | |
| 7,251,091 B2 | 7/2007 | Takeuchi et al. | |
| 7,692,887 B2 | 4/2010 | Dolan, Jr. et al. | |
| 2002/0030916 A1 * | 3/2002 | Patti et al. | 360/66 |

* cited by examiner

*Primary Examiner* — Regina N Holder
(74) *Attorney, Agent, or Firm* — Griffiths & Seaton PLLC

(57) ABSTRACT

Magnetoresistive (MR) bias is dynamically controlled in a tape drive using a processor device. Upon determining head amplitude is below a threshold value, the MR bias is adjusted for increasing the head amplitude and extending the useful life span of the tape drive.

24 Claims, 4 Drawing Sheets

US 8,767,326 B2

DYNAMICALLY CONTROLLING MAGNETORESISTIVE BIAS

BACKGROUND OF THE INVENTION

Field of the Invention

The present invention relates in general to computers, and more particularly to dynamically controlling magnetoresistive (MR) bias in a tape drive over the life usage of the tape drive.

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives and tape drives. Tape, such as magnetic tape, provides for physically storing data which may be archived or which may be stored in storage shelves of automated data storage libraries, and accessed when required. As an archival medium, tape often comprises the only copy of the data. In these and other situations, accuracy of the data and the prevention of damage to the tape can be a relatively high priority. However, due to the various processing components and applications, tape drives within the computer systems often encounter a worn condition as the tape drive approaches an end-of-life.

SUMMARY OF THE DESCRIBED EMBODIMENTS

In one embodiment, a method is provided for dynamically controlling magnetoresistive (MR) bias in a tape drive over the life usage of the tape drive. Upon determining head amplitude is below a threshold value, the MR bias is adjusted for increasing the head amplitude and extending the useful life span of the tape drive.

In another embodiment, a computer system is provided for dynamically controlling MR bias in a tape drive. The computer system includes a computer-readable medium and a processor in operable communication with the computer-readable medium. The processor, upon determining head amplitude is below a threshold value, dynamically adjusts the MR bias to increase the head amplitude and extend the useful life span of the tape drive.

In a further embodiment, a computer program product is provided for dynamically controlling MR bias in a tape drive. The computer-readable storage medium has computer-readable program code portions stored thereon. The computer-readable program code portions include a first executable portion that, upon determining head amplitude is below a threshold value, dynamically adjusts the MR bias to increase the head amplitude and extend the useful life span of the tape drive.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
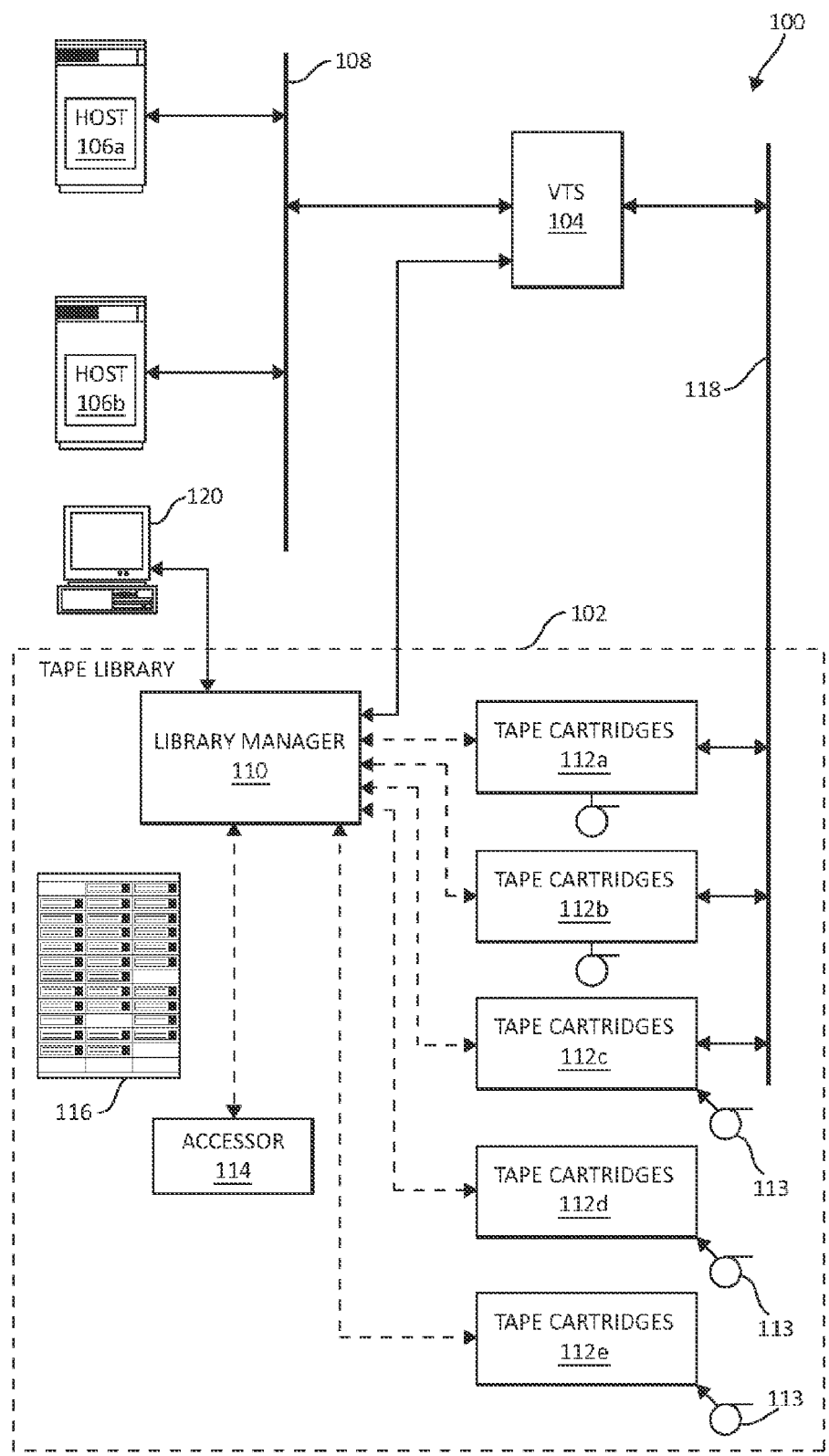
FIG. 1 is a block diagram of an exemplary embodiment of a representative virtual tape system in which aspects of the present invention may be realized.

With increasing demand for faster, more powerful and more efficient ways to store information, optimization of storage technologies is becoming a key challenge, particularly in tape drives. Modern tape drives operate at very high linear and track densities and must accommodate any of several media vendors, each with their own peculiarities. As such, the tape drive is sensitive to many degradation factors, including wear. As a tape drive is used, the magnetic head is worn such that the spacing between the read sensor (the read head) and the medium (the tape) is increased. This spacing causes the read-back amplitude to decrease. Over time, with usage, the head can wear such that the read-back operation is degraded or may fail. Moreover, as the tape drives approach end-of-life, the tape head may reach a worn condition that results in degraded drive performance. The degraded condition often correlates with marginal head amplitude. Possible end-of-life failure mechanisms include minimum detector requirements (SNR bandwidth) and write feed-through, both helped considerably by higher read-back amplitudes. Thus, a need exists for improving tape head amplitude so that tape drive performance may improve and life of the tape drive may be extended.

Any actions that the tape drive can take to self-optimize and extend the tape drive's life is extremely valuable. The tape drive may periodically perform self-maintenance procedures. These procedures can be triggered by usage or detected performance degradation. This self maintenance may include optimizing a plethora of read channel settings, such as write current, read bias, read filter settings, etc. As used herein, the self maintenance process, or settings adjustment procedures, is termed calibration. Calibrations are performed for the purposes of maintaining and updating parameters pertaining to the tape head. It may include, but is not limited to, comparing measurements of a known magnitude or correctness and/or checking, altering, regulating, marking, setting, adjusting, and/or determining by a comparison of standards/parameters (e.g., the graduations of a quantitative measuring instrument). Thus, in one embodiment, the present invention seeks to utilize a calibration (e.g., a drive calibration) to improve tape head amplitude by increasing the reference MR bias and extend the MR bias range. A reference MR bias value is used to calculate the optimal operating bias of each track of a tape head. The operating bias of each track is chosen for optimal track performance and can be any value within a range of values known as the MR bias range. Over time, tape head amplitude decreases because wear increases the spacing between the tape and head. Readback amplitude is proportional to the MR bias value, therefore, amplitude can be raised by increasing the reference bias and the bias optimization range over which the operating bias can be chosen for each head track. However, simply increasing the reference MR bias may not be advisable because higher values can compromise the tape heads that are not yet in a worn condition. A new head may not tolerate higher MR bias levels and could be damaged or become unstable. The decision as to whether or not to increase the reference MR bias needs to be made on a head-by-head basis by its usage and wear. One way to make this decision is to monitor fields in the drive code that accumulate how many meters of tape have run across the tape head. By monitoring these fields, one can change the MR bias based on the number of meters processed. The drawback to this solution is that assumptions are made between meters processed and head wear. Most modern tape drives have to accommodate various media types and vendors, all of varying quality. Additionally, since these fields have to be manually reset, there is a higher risk of damaging a good tape head if parts changes (head and/or card) occur.

Thus, to address this need, in one embodiment, the present invention seeks to utilize a calibration to improve tape head amplitude by increasing the reference MR bias and extend the MR bias range. Calibrations are performed for the purposes of maintaining and updating parameters pertaining to the tape head. A reference MR bias value is used to calculate the optimal operating bias of each track of a tape head. The operating bias of each track is chosen for optimal track performance and can be any value within a range of values known as the MR bias range. Over time, tape head amplitude decreases due to usage. Readback amplitude can be raised by increasing the reference bias and the range at which the operating bias can be chosen for each head track so that channels can calibrate the read bias by dynamically adjusting the reference MR bias and range by monitoring head amplitude via drive calibration results and determining if the tape head amplitude has fallen below a threshold value. Thus, the MR bias adjustments can be made on a per head basis and the tape drive can manage the read bias by itself without the need for external controls. In the event of parts changes, the tape drive will adjust dynamically based on the amplitude measurement from the drive calibration result, which minimizes the risk of damaging new heads.

Turning now to FIG. 1, a block diagram of an exemplary embodiment of a representative virtual tape system 100 in which aspects of the present invention may be realized is depicted. The system 100 includes a tape library 102, at least one VTS 104 (primary cache), and at least one host 106 (shown as 106a and 106b). Each host 106 may be a mainframe computer. Alternatively, the host (users) 106 may be servers or personal computers using a variety of operating systems. The host 106 and the VTS 104 are connected via a storage area network (SAN) 108 or another suitable communications channel, for example, an Enterprise System Connection (ESCON) channel used in an IBM® mainframe computers. The tape library 102 may include a library manager 110, one or more data drive devices that may be tape cartridges 112 (secondary cache shown as 112a-e), an accessor 114, and a plurality of mountable media 116. In one embodiment, the mountable media 116 includes tape cartridges, magnetic disks, optical disks, CDs, DVDs, other devices that can store data and be mounted to a drive unit, and the like. The library manager 110, which includes at least one computing processor, may be interconnected with and may control the actions of the tape cartridges 112 and the accessor 114. The mechanisms of the illustrated embodiments use two types of cache, a primary cache (VTS 104) and a secondary cache in the hierarchical storage management (HSM) system. Such configuration allows the VTS 104 to present to the user or host 106 a file on the disk cache as if it were a virtual tape and the user writes or reads data to or from the file. The file, as the virtual tape generated by the host, is later migrated to a real tape at an appropriate time. However, the mechanisms of the illustrated embodiments may provide for the real tape or tape cartridges to be real or virtual.

In FIG. 1, five tape cartridges 112a, 112b, 112c, 112d, and 112e are shown. The present invention is operable with one or more tape drives 113. The tape drives 113 are configured for assisting with mounting and demounting user data and log data. The tape cartridges 112 may share one single repository of mountable media 116. Alternatively, the tape cartridges 112 may utilize multiple repositories of mountable media 116. The tape cartridges 112 may advantageously be distributed over multiple locations to decrease the probability that multiple tape cartridges 112 will be incapacitated by a disaster in one location.

The interconnections between the library manager 110, the tape cartridges 112, and the accessor 114 are shown as dashed lines to indicate that the library manager 110 transmits and receives control signals, rather than data to be stored or retrieved, to the tape cartridges 112 and/or the accessor 114. Data for storage or retrieval may instead be transmitted directly between the VTS 104 and the tape cartridges 112 via a network 118, which may be a storage area network, (SAN), local area network (LAN), wide area network (WAN), or another suitable type of network, including the Internet or a direct connection between the VTS 104 and the tape cartridges 112 via a point to point or multi-drop buss connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and tape cartridges 112. The accessor 114 typically includes a gripper and a bar code scanner, or a similar read system mounted on the gripper. The bar code scanner is used to read a volume serial number (VOLSER) printed on a cartridge label affixed to the tape cartridge 112. In alternative embodiments, the tape cartridges 112 may be replaced by optical disk drives or other magnetic drives. Similarly, the mountable media 116 and the tape drive 113 may include magnetic media, optical media, or any other removable media corresponding to the type of drive employed. A control console 120 may be connected to the library manager 110. The control console 120 may be a computer in communication with the library manager 110 so that a user can control the operating parameters of the tape library 102 independently of the host 106. Control console 120 may also be a processor device controlling each and every component described herein and specifically; controlling the tape drives 113 for accomplishing the purposes of the invention described herein.

In addition, the described exemplary embodiment may be implemented by various means, such as hardware, software, firmware, or a combination thereof, operational on or otherwise associated with the computing environment. For example, the method 100, as well as the following illustrated exemplary methods may be implemented partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 2:
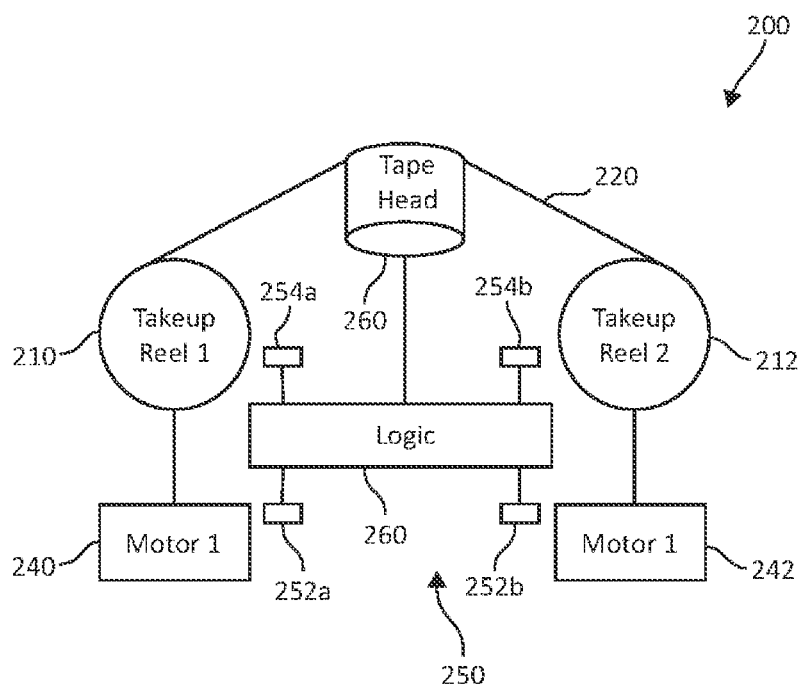
FIG. 2 is a block diagram of an exemplary embodiment of a tape system in which aspects of the present invention may be realized.

FIG. 2 is a block diagram of an exemplary embodiment of a tape system 200 in which aspects of the present invention may be realized. The tape system 200 includes first and second reels 210, 212. Magnetic recording tape 220 is spooled on the first and second reels 210, 212. The magnetic recording tape 220 is routed over a tape head 230 for reading and writing data on the magnetic recording tape 220. Reel motors 240, 242 control the positioning of the magnetic recording tape 220 over the tape head 230. The reel 210, 212, which is supplying tape at a particular time, is often referred to as the "outboard" reel and the reel 210, 212, which is taking up the tape at a particular time, is often referred to as the "inboard" reel. The reel motors 240, 242 are in turn controlled by a control system 250 which includes one or more motor operation sensors 252a, 252b and one or more tape radius sensors 254a, 254b which sense the radius R of the tape 220 at the reel 210, 212 the motor 240, 242 is driving. The motor operation sensors 252a, 252b can include electromotive force (EMF) sensors, for example. A servo system that moves the tape longitudinally is typically very precise, and the servo system bases the longitudinal movement on the instantaneous velocity of the tape. In addition, a calibration routine may be run while there is no tape in the drive. However, it is recognized that, for very long operations on a single tape cartridge, tension control may not be optimal since the motor parameters may have changed due to changes in operating conditions such as temperature variations. In accordance with one aspect of the present description, the control system 250 includes logic 260 for accomplishing the purposes of the present invention.

Figure 3:
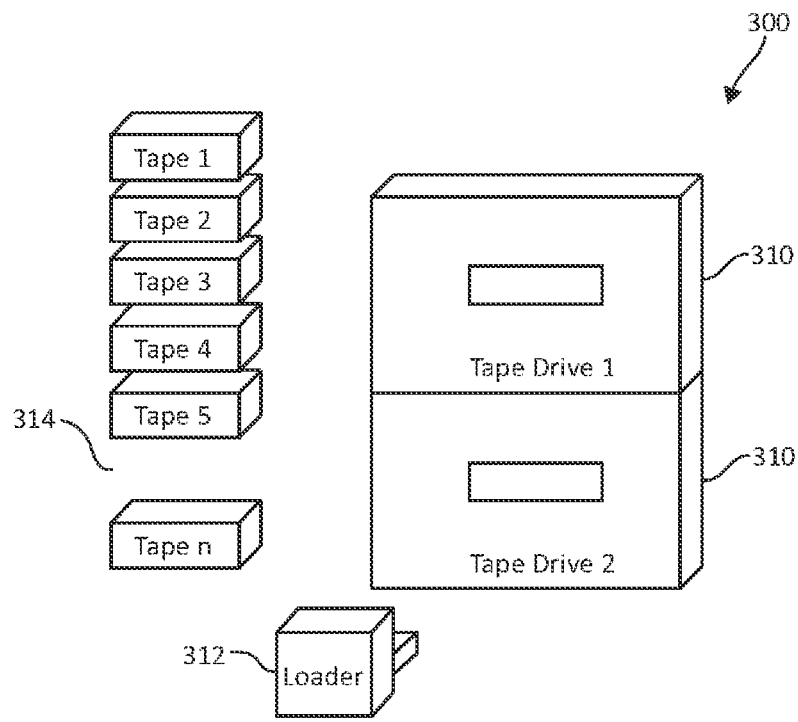
FIG. 3 is an additional block diagram of an exemplary embodiment of a tape library system in which aspects of the present invention may be realized.
Figure 4:
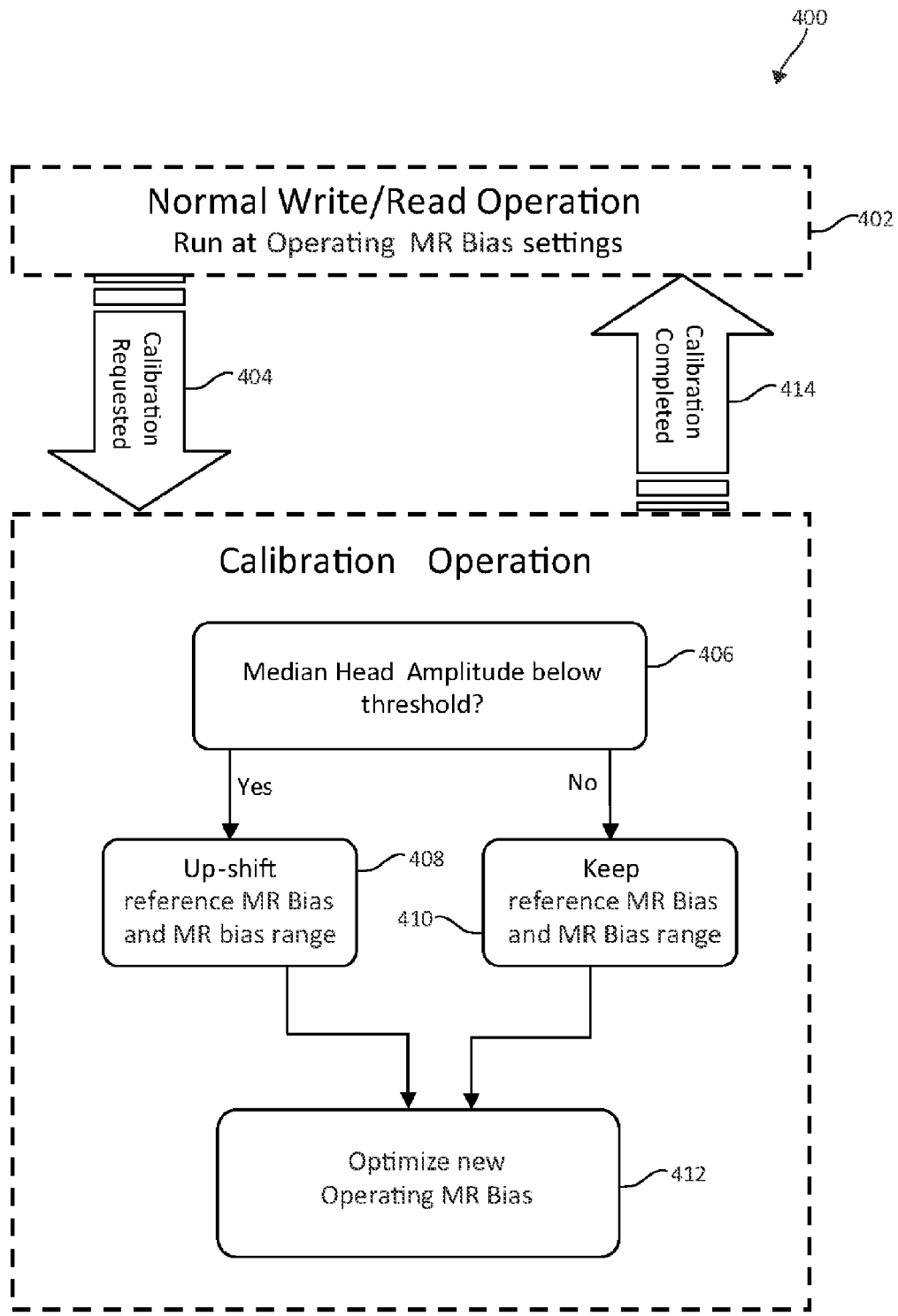
FIG. 4 is a flowchart illustrating an exemplary method for dynamically controlling magnetoresistive (MR) bias in a tape drive.

FIG. 3 is an additional block diagram of an exemplary embodiment of a tape library system 300 in which aspects of the present invention may be realized. The system 300 further includes a loader 312, and a library of tape cassettes or cartridges 314 that can be accessed by the loader 312 so as to load the tape drive 310 with an appropriately identified tape cassette or cartridge, Turning now to FIG. 4, a flowchart illustrating an exemplary method 400 for dynamically controlling magnetoresistive (MR) bias in a tape drive is depicted. The method 400 begins (step 402) with normal write/read operations, where the drive is operating with current, or operating, MR Bias settings (values). During normal drive operation, a calibration request might occur (step 404). The method 400 then determines if the median tape head amplitude, as measured across all tracks, has fallen below a threshold value at the reference MR bias (step 406). If yes, the method 400 dynamically adjusts (e.g., increases or up-shifts) the reference MR bias and the MR bias range for increasing the head amplitude (step 408). If no, the method 400 keeps/maintains the reference MR bias settings and MR bias range (step 410). Next, the method 400 may dynamically readjust/recalibrate the calibration settings of the tape drive using the newly adjusted reference MR bias range and/or optimize new operating MR bias settings (step 412). The method 400 ends and completes the calibration process (step 414). Note that head wear typically proceeds similarly across all tracks. Therefore, adjusting control settings of all tracks by the median readback amplitude of the group is valid.

In other words, during a normal tape drive operation, a calibration may occur. As part of the calibration, the median head amplitude will be monitored against set thresholds for determining if the head amplitude is below the threshold value. If the median tape head amplitude falls below the threshold, the MR bias (e.g., reference MR bias) settings are adjusted for the worn condition and the tape drive will operate at the adjusted, higher MR bias. This automatic adjustment increase of the MR bias for increasing the tape head amplitude occurs during a calibration of the tape drive. The adjusted MR bias is also used for dynamically readjusting all of the channel settings of the tape drive. If the median head amplitude has not fallen below the threshold, no change will be made and the drive will continue to operate at the current bias.

Figure 5:
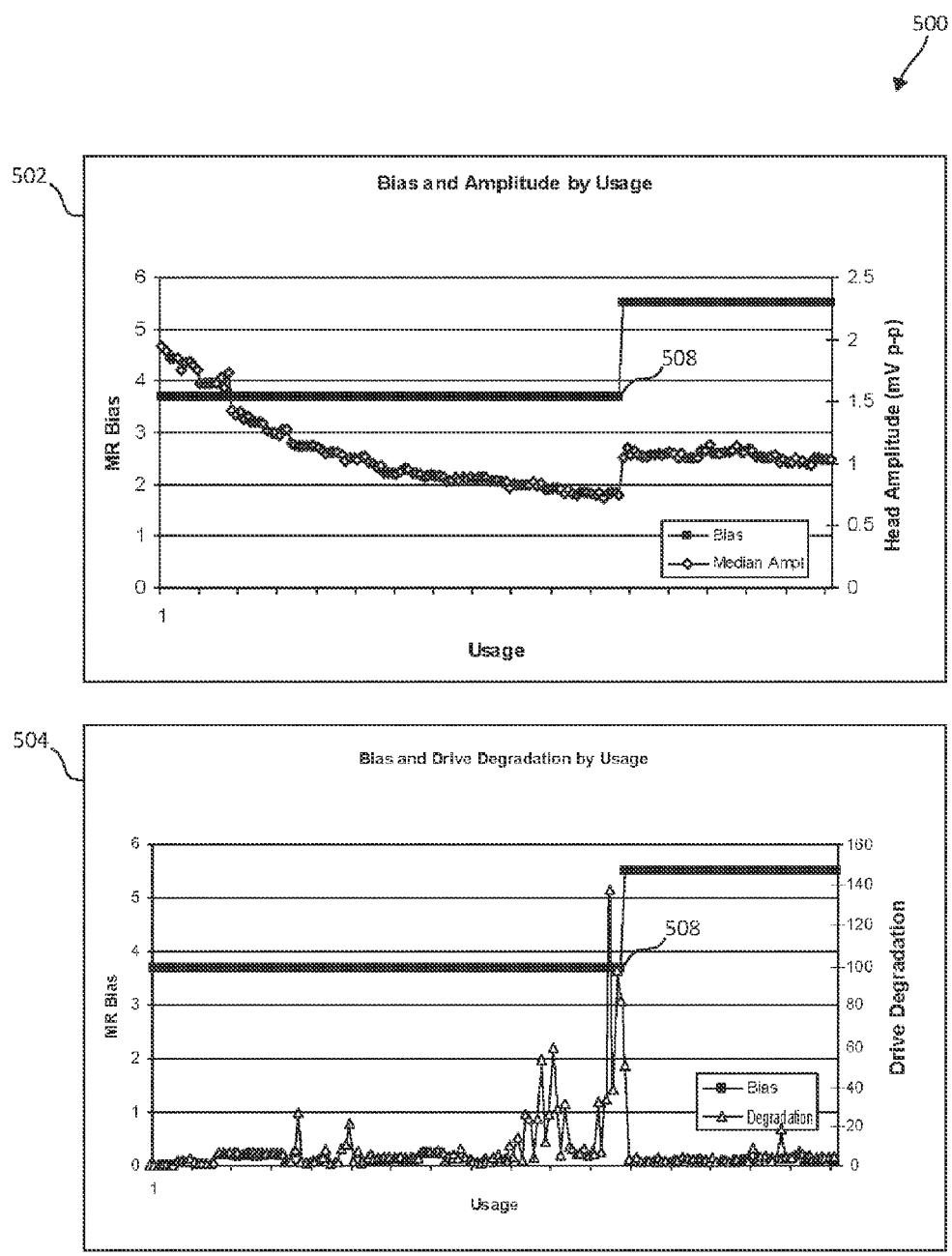
FIG. 5 is a graph illustrating exemplary results from dynamically adjusting the magnetoresistive (MR) bias for increasing the head amplitude above the threshold value.

FIG. 5 is a graph illustrating exemplary results 500 from dynamically adjusting the magnetoresistive (MR) bias for increasing the head amplitude above the threshold value. Graph 502 illustrates the MR bias and amplitude by usage. Graph 504 illustrates bias and drive degradation by usage. As illustrated in FIG. 5, the MR bias is shown against the left ordinate of the sample graphs 502 and 504 having a variety of ranges (e.g., 0 to 6 shown only as an illustration). Graph 502 illustrates on the right ordinate the head amplitude (mV p-p) with sample ranges from 0-to 2.5 mV p-p. In graph 502, the MR bias (the dark solid line) has a reference MR bias setting around 3.75. The median head amplitude, represented by the jagged shaped line, starts around 2 mV p-p. During the usage phase, meaning during a normal tape drive operation, the median head amplitude starts to fall and then continues to fall during usage (e.g., the normal operation). Since the median head amplitude is being monitored against set thresholds for determining if the head amplitude is below the threshold value, at point 508, the MR bias (e.g., reference MR bias) settings are dynamically adjusted for increasing the head amplitude. Once the automatic adjustment of the MR bias occurs, the graph illustrates the rise in the head amplitude from around 0.8 to around 1.0 mV p-p. This automatic adjustment of the MR bias for increasing the tape head amplitude occurs during a calibration of the tape drive. Also, once the automatic adjustment occurs, the median tape head amplitude in this example remains around 1.0 mV p-p thereby increasing the life of the tape drive.

An additional benefit of dynamically (e.g., automatically) adjusting the MR bias, for increasing the tape head amplitude, is improving the performance of the drive, as illustrated in graph 504. Similar to graph 502, as illustrated in graph 502, the MR bias (the dark solid line) has a reference MR bias setting around 3.75. The median head amplitude, represented by the jagged shaped line (formed with diamond shapes) in graph 502, starts around 2.0 mV p-p. On the right side of graph 504, a scale of drive degradation ranging from an arbitrary range from 0 to 160, which is used for illustration purposes, is depicted. Drive degradation correlates to drive performance—the lower the drive degradation, the better the performance of the drive. Prior to the automatic adjustment of the MR bias at point 508 in FIG. 504, the jagged line (illustrating drive degradation) illustrates increasing degradation with usage. Once the automatic adjustment of the MR bias for increasing the tape head amplitude is performed (at point 508), drive degradation diminishes. Thus, by performing an automatic adjustment of the MR bias in response to determining that the head amplitude is below the threshold value, the tape head amplitude is increased and the drive degradation is decreased thereby improving the efficiency, productivity, and longevity of a tape drive.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for controlling magnetoresistive (MR) bias in a tape drive using a processor device, the method comprising:
    calculating an optimal operating MR bias within an MR bias range for each track of a tape head using a reference MR bias;
    monitoring during a calibration operation the median tape head amplitude, as measured across all tracks of the tape head, against predetermined thresholds of the tape drive for determining if the median tape head amplitude is below the threshold value;
    upon determining the median tape head amplitude is below the threshold value during the calibration operation, dynamically adjusting, during the calibration operation, the reference MR bias and the MR bias range for increasing the median tape head amplitude.

2. The method of claim 1, further including optimizing optimal operating MR bias during the calibration operation.

3. The method of claim 2, further including raising a readback amplitude using the adjusted reference MR bias.

4. The method of claim 1, further including dynamically readjusting a plurality of calibration settings of the tape drive using the adjusted reference MR bias.

5. The method of claim 1, further including maintaining the reference MR bias and the MR bias range if the median tape head amplitude is below the threshold value during the calibration operation.

6. The method of claim 1, wherein the dynamically adjusting further includes dynamically increasing the reference MR bias and the MR bias range for increasing the median tape head amplitude.

7. The method of claim 1, further including using the adjusted reference MR bias for completing a calibration of the tape drive.

8. The method of claim 1, wherein the dynamically adjusting further includes dynamically adjusting the reference MR bias for each individual one of a plurality of tape heads, wherein the tape drive manages the MR bias without the need for external controls.

9. A system for dynamically controlling magnetoresistive (MR) bias in a tape drive, the system comprising:
   a tape head, and
   a processor device, controlling the tape head, wherein the processor device:
      calculates an optimal operating MR bias within an MR bias range for each track of a tape head using a reference MR bias,
      monitors during a calibration operation the median tape head amplitude, as measured across all tracks of the tape head, against predetermined thresholds of the tape drive for determining if the median tape head amplitude is below the threshold value;
      upon determining the median tape head amplitude is below the threshold value during the calibration operation, dynamically adjusts, during the calibration operation, the reference MR bias and the MR bias range for increasing the median tape head amplitude.

10. The system of claim 9, wherein the processor device optimizes a new optimal operating MR bias during the calibration operation.

11. The system of claim 10, wherein the processor device raising a readback amplitude using the adjusted reference MR bias.

12. The system of claim 9, wherein the processor device dynamically readjusts a plurality of calibrations of the tape drive using the adjusted reference MR bias.

13. The system of claim 9, wherein the processor device maintains the reference MR bias and the MR bias range if the median tape head amplitude is below the threshold value during the calibration operation.

14. The system of claim 9, wherein the processor device dynamically increases the reference MR bias and the and the MR bias range for increasing the median tape head amplitude.

15. The system of claim 9, wherein the processor device uses the adjusted reference MR bias for completing a calibration of the tape drive.

16. The system of claim 9, wherein the processor device dynamically increases the reference MR bias for the tape head, and manages the MR bias without the need for external controls.

17. A computer program product for dynamically controlling magnetoresistive (MR) bias in a computing environment by a processor device, the computer program product comprising a non-transitory computer-readable storage medium having computer-readable program code portions stored therein, the computer-readable program code portions comprising:
   a first executable portion that calculates an optimal operating MR bias within an MR bias range for each track of a tape head using a reference MR bias;
   a second executable portion that monitoring during a calibration operation the median tape head amplitude, as measured across all tracks of the tape head, against predetermined thresholds of the tape drive for determining if the median tape head amplitude is below the threshold value;
   a third executable portion that, upon determining the median tape head amplitude is below the threshold value during the calibration operation, dynamically adjusts, during the calibration operation, the reference MR bias and the MR bias range for increasing the median tape head amplitude.

18. The computer program product of claim 17, further including a fourth executable portion that optimizes a new optimal operating MR bias during the calibration operation.

19. The computer program product of claim 18, further including a fourth executable portion that raises a readback amplitude using the adjusted reference MR bias.

20. The computer program product of claim 17, further including a fourth executable portion that dynamically readjusts a plurality of calibrations of the tape drive using the adjusted reference MR bias.

21. The computer program product of claim 17, further including a fourth executable portion that maintains the reference MR bias and the MR bias range if the median tape head amplitude is below the threshold value during the calibration operation.

22. The computer program product of claim 17, further including a fourth executable portion that dynamically increases the MR bias and the MR bias range for increasing the tape head amplitude.

23. The computer program product of claim 17, further including a fourth executable portion that uses the adjusted reference MR bias for completing a calibration of the tape drive.

24. The computer program product of claim 17, further including a fourth executable portion that dynamically adjusts the reference MR bias for each individual one of a plurality of tape heads, wherein the tape drive manages the MR bias without the need for external controls.

* * * * *